United States Patent Office 2,836,587
Patented May 27, 1958

2,836,587
METALLIZABLE MONOAZO-DYESTUFFS AND COMPLEX METAL COMPOUNDS

Arthur Buehler, Rheinfelden, and Christian Zickendraht, Binningen, Switzerland, assignors to Ciba Limited, Basel, Switzerland, a Swiss firm No Drawing. Application October 17, 1955
Serial No. 541,043
Claims priority, application Switzerland
December 7, 1951
19 Claims. (Cl. 260—147)

This is a continuation-in-part of our copending application Ser. No. 323,502, filed December 1, 1952, and now abandoned.

According to this invention valuable new metallizable monoazo-dyestuffs are made by coupling a diazo compound of an amine free from sulfonic acid and carboxylic acid groups and corresponding to the general formula (1)
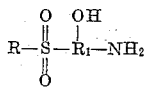

in which R represents an aralkyl or aryl radical, and $R_1$ represents a benzene radical in which the hydroxyl and amino groups are in ortho-position relatively to one another, with a coupling component free from sulfonic acid and carboxylic acid groups and capable of coupling in a position vicinal to a hydroxyl group.

The new amines of the general Formula 1 used as starting materials may contain in the radical R and/or advantageously in the radical $R_1$ further substituents, such as halogen atoms, for example chlorine; alkyl groups, for example methyl; alkoxy groups, for example methoxy; nitro groups; —CO-alkyl groups or acylamino groups, for example, acetylamino. Those radicals must not contain sulfonic acid or carboxylic acid groups. These new starting materials can be prepared, for example, from salts of ortho-nitro-halogen-benzene sulfinic acids, especially from alkali salts of ortho-nitro-chloro-benzene sulfinic acids, or from ortho-nitro-halogen-benzene sulfonic acid halides. For example, the sodium salt of a 2-nitro-1-chlorobenzene sulfinic acid may be reacted with an aralkylhalide, especially an aralkyl chloride, to form the corresponding sulfone, replacing the chlorine atom in the 1-position of the resulting sulfone by a hydroxyl group by reaction with an alkali hydroxide or alkaline earth metal hydroxide, and finally converting the nitro group in the 2-position into an amino group by a method in itself known. 2-amino-1-hydroxybenzene-5-sulfones can be obtained from the corresponding ortho-amino-hydroxybenzene sulfinic acids by converting the corresponding oxazolone derivative, for example, into its sodium salt, reacting the latter with an aralkyl halide, and hydrolyzing the oxazolone ring in the resulting sulfone by means of an alkali to liberate the amino and hydroxyl groups. The compounds of the Formula 1, in which R represents an aryl radical, can be prepared from ortho-nitro-halogen-benzene sulfonic acid halides. Advantageously an ortho-nitro-chlorobenzene sulfonic acid chloride is condensed in the presence of a Friedel-Crafts catalyst such, for example, as $FeCl_3$ or $AlCl_3$, with or without the use of a suitable solvent such as carbon disulfide or the like, with the selected aromatic compound, which is advantageously of the benzene series, for example, with benzene, toluene, xylene, an alkoxy benzene or the like, the chlorine atom bound in ortho-position to the nitro group in the resulting sulfone is replaced by a hydroxyl group by reaction with an alkali hydroxide or an alkaline earth metal hydroxide, and finally the nitro-group in ortho-position relatively to the hydroxyl group introduced is reduced to an amino group by a method in itself known. In this case also it is possible instead of starting from an ortho-nitro-halogen-benzene sulfonic acid halide, to start from the corresponding ortho-amino-hydroxy-compound which contains the amino and hydroxyl groups in the form of an oxazolone ring, so that after condensation to form the sulfone by the Friedel-Crafts method it is only necessary to hydrolyze the oxazolone ring in order to obtain the desired ortho-amino-hydroxybenzene aryl sulfone.

As examples of compounds of the Formula 1, obtainable by the methods described above and serving as starting materials for the present process, there may be mentioned:

2-amino-1-hydroxy-4-nitrobenzene-6-phenyl sulfone, 2-amino-1-hydroxy-4-chlorobenzene-5- or -6-phenyl sulfone and 2-amino-1-hydroxy-4-nitrobenzene-6-benzyl sulfone.

Especially valuable results are obtained with 3-amino-4-hydroxydiphenyl sulfone, 4-amino-3-hydroxydiphenyl sulfone, 2-amino-1-hydroxybenzene-4- or -5-benzyl sulfone, 3-amino-4-hydroxy-4'-methyl-1:1'-diphenyl sulfone, 3-amino-4-hydroxy-4'-methoxy-1:1'-diphenyl sulfone, 4-amino-3-hydroxy-4'-methyl-1:1'-diphenyl sulfone and 3-amino-4-hydroxy-4'-chloro-1:1'-diphenyl sulfone.

As coupling components for the present process there come into consideration compounds free from sulfonic acid and carboxylic acid groups and capable of coupling in a position vicinal to a hydroxyl group, that is to say, compounds containing a phenolic hydroxyl group and compounds which owe their capacity for coupling to a keto-methylene group. These latter compounds may contain the keto-methylene group in an open chain or in a heterocyclic ring. There may be mentioned for example:

(a) Para-substituted hydroxybenzenes such as 4-methyl-, 4-chloro-, 4-methoxy-, 3:4-dimethyl-, 4-tertiary-amyl- or 4-acetylamino-1-hydroxybenzene, 4-methyl-2-acetylamino-1-hydroxybenzene. Dihydroxybenzenes such as resorcinol, hydroxynaphthalenes such as 2-hydroxynaphthalene, 2:6-dihydroxynaphthalene, 2-hydroxy-6-bromo- or -6-methoxynaphthalene, 2-hydroxynaphthalene-4-, -5-, -6- or -7-sulfonic acid amide, 1-hydroxy-4-methylnaphthalene, 1-hydroxy-5-chloronaphthalene, 1-hydroxy-5:8-dichloronaphthalene, 1-hydroxynaphthalene-3-, -4- or -5-sulfonic acid amide; 1-hydroxy-4-methylnaphthalene-8-sulfonic acid amide, and also 1-acylamino-7-hydroxynaphthalenes such as 1-acetylamino-, 1-n-butyrylamino-, 1-benzoylamino-7-hydroxynaphthalene or 7-hydroxynaphthyl-(1)-carbamic acid methyl or ethyl ester.

(b) Pyrazolones such as 3-methyl- or 3-phenyl-5-pyrazolone, 1-n-butyl-3-methyl-5-pyrazolone, 1-phenyl-3-methyl-5-pyrazolone, 1-phenyl-3-methyl-5-pyrazolone-3'- or -4'-sulfonic acid amide, 5-pyrazolone-3-carboxylic acid amide, 5-pyrazolone-3-carboxylic acid methyl-, ethyl-, isopropyl-, secondary-butyl-, tertiary-butyl- or n-butyl-amide, 5-pyrazolone-3-carboxylic acid phenylamide or tolylamide, 1-phenyl-5-pyrazolone-3-carboxylic acid amide or methylamide, barbituric acids such as barbituric acid itself dihydroxyquinolines such as 2:4-dihydroxyquinoline, acylacetic acid esters or amides such as acetoacetic acid amide, acetoacetic acid methyl-, n-butyl- or phenyl-amide, acetoacetic acid dimethylamide, acetoacetic acid ortho-chlorophenylamide, 1-acetoacetylaminobenzene-2-, -3- or -4-sulfonic acid amide, benzoylacetic acid amide. Among these compounds valuable results are obtained, more especially, by coupling those which contain a sulfonic acid amide group with the sulfones of high molecular weight mentioned.

The amines of the Formula 1 can be diazotized in the usual manner, for example, with the use of sodium nitrite and hydrochloric acid. The resulting diazo compounds can be coupled with the aforesaid coupling components in the usual manner, for example, in an alkaline medium.

After the coupling reaction the dyestuffs can easily be separated from the coupling mixture by filtration, since they usually are only slightly soluble in water.

The monoazo-dyestuffs obtainable as described above are new. They contain no sulfonic acid or carboxylic acid groups and correspond to the general formula (2) 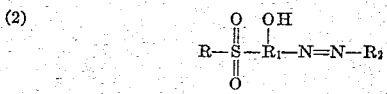

in which R represents an aralkyl or aryl radical, $R_1$ represents a benzene radical containing the amino- and hydroxyl groups in ortho-position relatively to one another, and $R_2$ represents the radical of a coupling component which is bound to the azo linkage in a position vicinal to a hydroxyl group.

They are sufficiently soluble in the form of their alkali compounds for dyeing from dyebaths which require no addition of acid. Accordingly, they are principally suitable for dyeing by the single bath chroming process, but in some cases they also yield good results in dyeing by the after-chroming process.

The invention also includes treatment of the monoazo-dyestuffs in substance with an agent yielding metal, for example, an agent yielding iron, nickel, aluminum, copper and especially cobalt or chromium. The metallization, for example, chroming, may be carried out in the case of the more easily soluble dyestuffs, for example, those containing a sulfonamide group, by treatment with a salt of trivalent chromium such as chromium acetate, chromium fluoride or a chromium sulfate, in such manner that a chromium compound is produced which contains about one atom of chromium bound in complex union with one molecule of dyestuff.

For this purpose the chroming may be carried out in an acid medium, under atmospheric pressure for a long period, for example, several hours, and at the boiling temperature of the reaction mixture, or at a higher temperature and in the presence of a solvent such as alcohol and under pressure.

Especially valuable complex metal compounds are obtained by carrying out the metallization with an agent yielding cobalt or chromium under conditions such that the resulting cobaltiferous or chromiferous azo dyestuff contains one atom of cobalt or chromium in complex union with substantially 2 molecules of monoazo-dyestuff. For this purpose it is generally desirable to use for every 2 molecular proportions of a dyestuff of the Formula 2 or of a mixture of about 1 molecular proportion each of two different dyestuffs of which at least one corresponds to the general Formula 2, a quantity of an agent yielding metal containing one atomic proportion of the metal and/or to carry out the metallization in a weakly acid to alkaline medium. Consequently metal compounds which are stable towards alkaline media are especially suitable for carrying out the process, for example, cobalt or advantageously chromium compounds of aliphatic dicarboxylic acids or hydroxycarboxylic acids or above all chromium compounds of aromatic ortho-hydroxy-carboxylic acids which contain the metal in complex union. As examples of aliphatic dicarboxylic acids and hydroxycarboxylic acids there may be mentioned inter alia oxalic acid, lactic acid, glycollic acid, citric acid and especially tartaric acid and, among the aromatic hydroxy-carboxylic acids there may be mentioned those of the benzene series such as 4-, 5- or 6-methyl-1-hydroxybenzene-2-carboxylic acid and above all 1-hydroxybenzene-carboxylic acid itself. As agents yielding cobalt for preparing complex compounds of the kind last mentioned there also come into consideration simple salts of divalent cobalt such as cobalt sulfate, cobalt acetate or cobalt formate. Conversion of the dyestuffs into the complex metal compounds is advantageously carried out with the aid of heat, under atmospheric or super-atmospheric pressure, for example, at the boiling temperature of the reaction mixture, if desired in the presence of suitable additions, for example, salts of organic acids, bases, organic solvents or other agents assisting the formation of complexes.

The metallization described above may, for example, be carried out upon a single dyestuff of the Formula 2. However, it is also possible and in many cases it is of advantage, for example, for producing various tints, to metallize correspondingly a mixture of two different dyestuffs of that kind or a mixture of one dyestuff of the Formula 2 and another ortho:ortho'-dihydroxy-monoazo-dyestuff free from sulfonic acid and carboxylic acid groups, advantageously one which contains a sulfonic acid amide group.

The new metal compounds so obtained are cobalt or chromium compounds which contain less than one and preferably two molecules of monoazo-dyestuff in complex union with one atom of cobalt or chromium, and in which at least one of the monoazo-dyestuff molecules corresponds to the general Formula 2. Especially valuable are the cobalt and chromium compounds of this kind which contain two molecules of the same monoazo-dyestuff of the Formula 2.

These new cobalt and chromium compounds are soluble in water and weakly acid media, and are indeed more soluble than the dyestuffs from which they are prepared. They are suitable for dyeing various materials, such as plastic masses, resins, waxes, lacquers and the like, but especially for dyeing or printing animal materials such as silk, leather and especially wool, and also for dyeing or printing synthetic materials composed of superpolyamides or superpolyurethanes. They are suitable above all for dyeing from weakly alkaline, neutral or weakly acid, for example, acetic acid, baths. The dyeings so produced are distinguished by the special purity of their tints, good level character, good properties of wet fastness and very good fastness to light.

The following examples illustrate the invention, the parts and percentages being by weight unless otherwise stated and the relationship of parts by weight to parts by volume being the same as that of the kilogram to the liter:

*Example 1*

256 parts of 1-chloro-2-nitrobenzene-4-sulfonic acid chloride are dissolved in 500 parts of dry benzene and mixed gradually at 40° C. with 140 parts of aluminum chloride, whereupon hydrogen chloride is evolved. The mixture is maintained at 40–50° C. for 3–4 hours. The dark liquid is poured onto ice, and the benzene is expelled with steam. After cooling, the residue is filtered and the filter residue is washed with water. The resulting 1-chloro-2-nitrobenzene-4-phenyl-sulfone, which melts at 125–126° C. after recrystallization from alcohol, is heated while still moist in 500 parts of caustic soda solution of 10 percent strength for 3 hours at the boil until a practically clear solution is obtained. The solution is acidified with hydrochloric acid, and the precipitated 4-hydroxy-3-nitro-1:1'-diphenyl sulfone is filtered off and washed with water. After recrystallization from alcohol it is in the form of yellow crystals which melt at 132–134° C. Finally the product is reduced in the usual manner with sodium sulfide, or subjected to catalytic reduction with hydrogen in the presence of nickel. 4-hydroxy-3-amino-1:1'-diphenyl sulfone is obtained in the form of a pale powder, which after recrystallization from alcohol melts at 159–161° C.

24.9 parts of the resulting 3-amino-4-hydroxy-1:1'-diphenyl sulfone are diazotized in the usual manner in solution in hydrochloric acid with sodium nitrite. The diazo compound is neutralized with sodium carbonate and coupled with a solution prepared from 19 parts of 5-pyrazolone-3-carboxylic acid-n-butylamide, 100 parts of water, 4 parts of sodium hydroxide and 5 parts of sodium carbonate. When the coupling has finished, the precipitated dyestuff is filtered off, washed with dilute sodium chloride solution and dried. There is obtained a dark powder which dissolves in hot water with a red-brown coloration and in concentrated sulfuric acid with a red-orange coloration. The dyestuff which corresponds to the formula

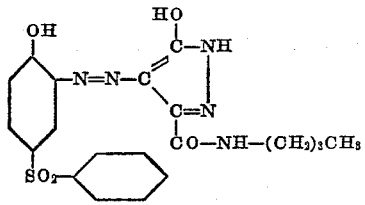

dyes wool by the after-chroming process or single bath chroming process pure red tints which are very fast to washing and light.

The 5-pyrazolone-3-carboxylic acid-n-butylamide used in this example may be prepared as follows:

15.6 parts of 5-pyrazolone-3-carboxylic acid ethyl ester are heated in 40 parts of n-butylamine for a long time at 75–95° C. under reflux. The excess of n-butylamine is then distilled off, the residue is dissolved in water, if desired, the mixture is filtered to remove impurities and filtrate is acidified with hydrochloric acid. The resulting 5-pyrazolone-3-carboxylic acid-n-butylamide melts sharply at 246–247° C. with decomposition, after recrystallization from ethyl alcohol.

The same product is obtained by suspending 5-pyrazolone-3-carboxylic acid in an inert solvent such as chlorobenzene, adding phosphorus trichloride to the resulting suspension, and simultaneously or subsequently treating with n-butylamine.

Example 2

4.43 parts of the dyestuff obtained as described in the second paragraph of Example 1 are suspended in 150 parts of water, then mixed with 5 parts by volume of a 2 N-solution of sodium hydroxide and 15 parts of a solution of sodium chromosalicylate containing 2.6 percent of chromium, and the mixture is boiled under reflux for about 4 hours. By neutralizing the chroming mixture with dilute acetic acid the chromium compound is completely precipitated. The dyestuff chromium complex, after being filtered off and dried, is a dark red powder which dissolves in hot dilute sodium carbonate solution with a red coloration and in concentrated sulfuric acid with a yellow-orange coloration. The chromium complex dyes wool or fibers of superpolyamides from a weakly alkaline, neutral or weakly acetic acid bath pure red tints which are fast to light and washing.

Example 3

In order to convert the dyestuff obtained as described in the second paragraph of Example 1 into its complex cobalt compound, 4.43 parts of the dyestuff are heated at 80° C. with 150 parts of water and 5 parts by volume of a 2 N-solution of sodium hydroxide, and mixed with 11 parts of a cobalt sulfate solution having a cobalt content of 2.95 percent. After heating for about ½ hour at 80–90° C. the formation of the complex is finished. By neutralization with dilute acetic acid the resulting cobalt complex of the dyestuff is completely precipitated. The filtered and dried dyestuff is a dark brown powder which dissolves in hot dilute sodium carbonate solution with an orange-brown coloration, and dyes wool from a neutral to weakly acetic acid bath orange-brown tints which are very fast to light.

In the following table are given the properties of further dyestuffs and metal complexes obtained in an analogous manner. In column *a* are given the tints of the dyeings obtainable on wool by the single bath chroming process, under *b* the tints obtained with the chromium complex and under *c* the tints of the cobalt complex on wool or fibers of superpolyamides:

| No. | Diazo-components | Azo-components | a | b | c |
|---|---|---|---|---|---|
| 1 | OH–C$_6$H$_3$(SO$_2$–C$_6$H$_5$)–NH$_2$ | CH$_3$–C=N, N–CH$_2$CH$_2$CH$_2$CH$_3$, CH$_2$–OC | orange | orange | yellow brown. |
| 2 | OH–C$_6$H$_3$(SO$_2$–C$_6$H$_5$)–NH$_2$ | naphthalene–OH | violet brown | violet brown | bordeaux. |
| 3 | OH–C$_6$H$_3$(SO$_2$–C$_6$H$_5$)–NH$_2$ | HO–naphthalene–NHCOCH$_3$ | grey | grey | violet grey. |
| 4 | OH–C$_6$H$_3$(SO$_2$–C$_6$H$_5$)–NH$_2$ | CH$_3$–C=N, N–C$_6$H$_5$, CH$_2$–OC | orange | orange | yellow brown. |
| 5 | OH–C$_6$H$_3$(SO$_2$–C$_6$H$_5$)–NH$_2$ | CH$_3$–C=N, N–C$_6$H$_4$–SO$_2$NH$_2$, CH$_2$–OC | do | do | Do. |

| No. | Diazo-components | Azo-components | a | b | c |
|---|---|---|---|---|---|
| 6 | OH, NH₂, SO₂—C₆H₅ (on benzene) | CH₃–C(=N–NH–)–CH₂–OC | yellow orange | yellow orange | Do. |
| 7 | OH, NH₂, SO₂—C₆H₅ (on benzene) | O=C—NH—C₆H₅ / C(=N–NH–) / CH₂—OC | red | red | brown orange. |
| 8 | OH, NH₂, SO₂—C₆H₅ (on benzene) | CH₃COCH₂C(=O)—HN—C₆H₄—SO₂NH₂ | brownish yellow | reddish yellow | yellow. |
| 9 | OH, NH₂, SO₂—C₆H₅ (on benzene) | O=C—NH—CH(CH₃)₂ / C(=N–NH–) / CH₂—OC | red | red | orange brown. |
| 10 | OH, NH₂, SO₂—C₆H₅ (on benzene) | H₂N—O₂S—naphthalene—OH | violet | violet | yellowish bordeaux. |
| 11 | OH, NH₂, SO₂—C₆H₅ (on benzene) | H₂C(CO—NH)(CO—NH)CO | | orange | yellow. |
| 12 | OH, NH₂, SO₂—C₆H₅ (on benzene) | OH—C₆H₄—CH₃ | | violet brown | brownish bordeaux. |
| 13 | OH, NH₂, SO₂—C₆H₅ (on benzene) | OH, HO—, N (quinoline-type) | | red | orange brown. |
| 14 | OH, NH₂, SO₂—C₆H₄—CH₃ (on benzene) | H₂C(CO—N–H)—C(=N)—CO—NH—CH(CH₃)(CH₃) | red | do | Do. |

| No. | Diazo-components | Azo-components | a | b | c |
|---|---|---|---|---|---|
| 15 | OH, NH₂, SO₂-C₆H₄-CH₃ (structure) | H₂C(CO—NH)(C=N)(CO—NH—(CH₂)₃—CH₃) (structure) | ...do... | ...do... | Do. |
| 16 | OH, NH₂, SO₂-C₆H₄-Cl (structure) | H₂C(CO—NH)(C=N)(CO—NH—(CH₂)₃—CH₃) (structure) | ...do... | ...do... | Do. |
| 17 | OH, NH₂, SO₂-C₆H₄-Cl (structure) | H₂C(CO—NH)(C=N)(CO—NHCH₂CH₂OH) (structure) | ...do... | ...do... | Do. |

The dyestuff obtained from the diazo- and azo-components listed in the above table under No. 5 corresponds to the formula

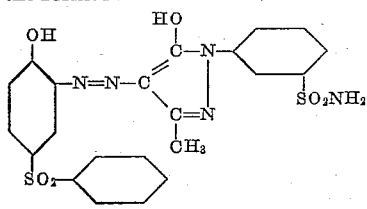

the dyestuff from the component listed under No. 6 corresponds to the formula

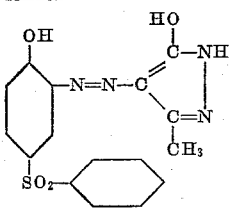

and that obtained from the components listed under No. 8 corresponds to the formula

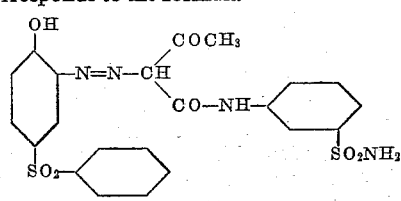

The 4 - hydroxy - 3 - amino - 4' - methyl - 1:1' - diphenylsulfone used to make the dyestuffs 14 and 15 in the above table can be prepared as follows:

256 parts of 1-chloro-2-nitrobenzene-4-sulfonic acid chloride are dissolved in 500 parts of dry toluene and gradually mixed with 140 parts of aluminum chloride at 40° C., hydrogen chloride evolving. The mixture is maintained for 3 to 4 hours at 40–45° C., the dark liquid is poured on to ice and the toluene expelled with steam. The still moist 1-chloro-2-nitro-benzene-4-(4'-methyl)-phenylsulfone so obtained is then heated at the boil in 500 parts of a caustic soda solution of 10% strength for 3 hours until the solution is practically clear. The latter is reduced with sodium sulfide according to the usual method. 4 - hydroxy - 3 - amino - 4' - methyl - 1:1'-diphenyl-sulfone is obtained as a grey powder which melts at 168–170° C. after having been recrystallized from alcohol.

The 4-hydroxy-3-amino-4'-chloro-1:1'-diphenylsulfone can be prepared as follows:

256 parts of 1-chloro-2-nitrobenzene-4-sulfonic acid chloride are dissolved in 500 parts of dry chlorobenzene and gradually mixed with 140 parts of aluminum chloride at 40–45° C. The mixture is heated for 24 hours at 55–60° C., hydrogen chloride evolving. The dark reaction mixture is poured on to ice and the chlorobenzene expelled with steam. The resulting, still damp 1-chloro-2-nitrobenzene-4-(4'-chloro)-phenyl sulfone is heated at the boil in 500 parts of a caustic soda solution of 10% strength for 4 to 6 hours until the solution is practically clear. The latter is reduced with sodium sulfide according to the usual method. The 4-hydroxy-3-amino-4'-chloro-1:1'-diphenyl sulfone is obtained in the form of a grey powder which has a melting point of 178° C. when recrystallized from alcohol.

*Example 4*

24.9 parts of 4-amino-3-hydroxy-1:1'-diphenylsulfone are diazotized in the usual manner in a hydrochloric acid solution with sodium nitrite. The diazo compound is neutralized with sodium carbonate and coupled with a solution prepared from 19 parts of 5-pyrazolone-3-carboxylic acid-n-butylamide, 100 parts of water, 4 parts of sodium hydroxide and 5 parts of sodium carbonate. When the coupling is finished, the completely precipitated dyestuff is filtered off, washed with dilute sodium chloride solution and dried. There is obtained a brown powder which dissolves in water and in concentrated sulfuric acid with a brown-red coloration.

The complex chromium compound obtained from the above dyestuff by the method described in Example 2 is a dark red powder, which dissolves in water with a red coloration and in concentrated sulfuric acid with an orange coloration, and dyes wool from a neutral or weakly acetic acid bath strong bordeaux tints of good fastness.

The 4-amino-3-hydroxy-1:1'-diphenyl-sulfone used in this example may be prepared as follows:

229 parts of benzoxazolone sulfochloride (obtained as described in French specification No. 873,201 by treating benzoxazolone with chlorosulfonic acid while heating) melting at 181° C. are introduced into a solution of 140 parts of aluminum chloride in 500 parts of carbon disulfide. 100 parts of benzene are introduced dropwise into the suspension heated at 40° C. The mixture is maintained at 40–50° C. until the evolution of hydrogen chloride has ceased, the brownish suspension is then poured on to ice, and the carbon disulfide and excess of benzene are expelled with steam. After cooling, the residue is filtered off, washed with water and boiled under reflux with 500 parts of sodium hydroxide solution of 10 percent strength for 3 hours until a clear slightly brownish solution is obtained. The solution is acidified with acetic acid, whereupon a strong evolution of carbon dioxide sets in. The precipitated finely crystalline 4-amino-3-hydroxy-1:1'-diphenylsulfone is filtered off, and washed with dilute sodium chloride solution and dried. When recrystallized from alcohol it melts at 189–190° C.

*Example 5*

4.43 parts of the dyestuff obtained as described in the first paragraph of Example 1 and 4.21 parts of the dyestuff obtained by coupling diazotized 2-amino-1-hydroxybenzene-4-sulfonic acid methyl amide with 1-(4'-chloro)-phenyl-3-methyl-5-pyrazolone, are suspended in 250 parts of water, then mixed with 10 parts by volume of a 2 N-solution of sodium hydroxide and 25 parts by volume of a solution of sodium chromosalicylate containing 2.6 percent chromium, and the mixture is boiled under reflux for about 4 hours. By neutralizing the chroming mixture with dilute acetic acid the chromium compound is completely precipitated. When dry it is a red powder which dissolves in water with an orange coloration and in concentrated sulfuric acid with a yellow coloration, and dyes wool from a neutral to weakly acetic acid bath full orange-red tints of good fastness.

*Example 6*

26.3 parts of 2-amino-1-hydroxybenzene-4-benzylsulfone are dissolved in 100 parts of water and 13.3 parts of sodium hydroxide solution of 30 percent strength, and after the addition of 6.9 parts of sodium nitrite the mixture is slowly introduced dropwise into 30 parts of hydrochloric acid of 30 percent strength and 150 parts of ice. In this manner there is obtained the sparingly soluble diazo compound of 2-amino-1-hydroxybenzene-4-benzyl sulfone. It is filtered off and introduced in the form of a moist filter cake into a solution prepared from 18 parts of 1-phenyl-3-methyl-5-pyrazolone, 100 parts of water, 6.7 parts of sodium hydroxide solution of 30 percent strength and 20 parts of a sodium carbonate solution of 10 percent strength. The coupling proceeds very rapidly. When it is finished the dyestuff formed is separated by filtering with suction.

After dissolving the resulting dyestuff in 600 parts of water and 26.5 parts of sodium hydroxide solution of 30 percent strength it is metallized by heating it for 3 hours with 120 parts of a solution of sodium chromosalicylate having a chromium content of 2.6 percent. The complex is isolated by the addition of sodium chloride. When dry it is a brown powder which dissolves in concentrated sulfuric acid with a yellow coloration and in sodium carbonate solution with an orange brown coloration, and dyes wool from a neutral or acetic acid bath orange tints having good properties of fastness.

By treating the dyestuff obtained as described in the first paragraph above with an agent yielding cobalt such as cobalt sulfate, the cobalt complex is obtained in the form of a yellow-brown powder which dyes wool from a neutral or acetic acid bath yellow-brown tints having good properties of fastness.

2-amino-1-hydroxybenzene-4-benzyl sulfone is obtained by condensing 2-nitro-1-chlorobenzene-4-sulfinic acid with benzyl chloride, hydrolyzing the resulting condensation product to form 2-nitro-1-hydroxybenzene-4-benzyl sulfone, and reducing the nitro group.

By using, instead of 2-amino-1-hydroxybenzene-4-benzyl sulfone, the isomeric 2-amino-1-hydroxybenzene-5-benzyl sulfonate a dyestuff is obtained of which the chromium complex dyes wool from a neutral or acetic acid bath red tints, and the cobalt complex thereof dyes wool orange brown tints.

*Example 7*

29.75 parts of 4-chloro-2-amino-1-hydroxybenzene-6-benzyl sulfone are dissolved in 200 parts of water while adding 4.4 parts of sodium hydroxide, and mixed with 6.9 parts of sodium nitrite. The resulting solution is added dropwise to 120 parts of hydrochloric acid of 10% strength, the temperature of the diazo solution mixture being maintained between 0–5° C. by the addition of ice. The diazo compound neutralized with sodium carbonate is combined with a solution prepared from 17.4 parts of 1-phenyl-3-methyl-5-pyrazolone, 100 parts of water, 4 parts of sodium hydroxide and 5 parts of sodium carbonate. After coupling is complete, the sparingly soluble dyestuff is filtered, washed with a dilute solution of sodium chloride and dried. A brown powder is obtained which dissolves in water with a red coloration and in concentrated sulfuric acid with a yellow brown coloration.

The complex chromium compound obtained from this dyestuff according to the method described in Example 2 is a red powder which dissolves in water with a red coloration and in concentrated sulfuric acid with an orange coloration and dyes wool from a neutral or weakly acetic acid bath in brown-red tints having good fastness properties.

If the dyestuff described above is converted into the complex cobalt compound according to the method described in Example 3, a brown powder is obtained which dissolves in water and in concentrated sulfuric acid with a yellow-brown coloration and dyes wool from a neutral or weakly acetic acid bath in full yellowish brown tints having good fastness properties.

The 4-chloro-2-amino-1-hydroxybenzene-6-benzyl sulfone used in this example can be prepared by converting 4-chloro-2-amino-1-hydroxybenzene-6-sulfonic acid with phosgene into the corresponding benzoxazolone compound. The latter is converted in the usual manner with phosphorus pentachloride into the sulfochloride of melting point 192–193° C., and the corresponding sulfinic acid of melting point 289–290° C. is prepared. Finally the sulfinic acid is mixed with benzyl chloride and the resulting condensation product of melting point 236° C. is hydrolyzed with dilute sodium hydroxide solution.

When in the first paragraph of this example there are used 28.35 parts of 5-chloro-3-amino-2-hydroxy-1:1'-diphenyl sulfone instead of the 4-chloro-2-amino-1-hydroxybenzene-6-benzyl sulfone, a metal-free dyestuff is obtained as a red powder which dissolves in water with a red coloration and in concentrated sulfuric acid with an orange coloration.

The chromium complex prepared from the above metal-free dyestuff according to Example 2 is a red powder which dissolves in water with a red coloration and in concentrated sulfuric acid with a brownish yellow coloration and dyes wool from a neutral or weakly acetic acid bath red tints having a good fastness properties, whilst the corresponding cobalt complex obtained according to Example 3 is a brown powder which dissolves in water and in concentrated sulfuric acid with a yellow-brown coloration and dyes wool from a neutral or weakly acetic acid bath brownish orange tints having good fastness properties.

The 5-chloro-3-amino-2-hydroxy-1:1'-diphenyl sulfone can be obtained from the 4-chloro-2-amino-1-hydroxybenzene-6-sulfochloride of melting point 192–193° C. by reacting it with benzene according to Friedel-Crafts and subsequent hydrolysis.

*Example 8*

2 parts of the chromiferous dyestuff obtainable as described in Example 2 are dissolved in 4000 parts of water, 10 parts of crystalline sodium sulfate are added, and 100 parts of well wetted wool are entered at 40–50° C. in the dyebath so prepared. 2 parts of acetic acid of 40 percent strength are then added, the temperature is raised to the boil in the course of ½ hour, and dyeing is carried on for ¾ hour at the boil. Finally the wool is rinsed with cold water and dried. The wool is dyed a level pure red tint of good fastness to washing and light.

The same dyeing is obtained by dyeing from a neutral bath, that is to say, without the addition of acetic bath to the bath.

A pure red dyeing is also obtained by using instead of wool, superpolyamide fibers (nylon).

What is claimed is:

1. A dyestuff selected from the class consisting of a monoazo dyestuff free from sulfonic and carboxylic acid groups and corresponding to the formula

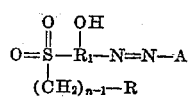

wherein R represents a benzene radical, $n$ represents a whole number which is at most 2, $R_1$ represents a benzene radical bound to the azo linkage in ortho-position relatively to the hydroxyl group and A represents the radical of a coupling component bound to the azo linkage in a position vicinal to a hydroxyl group, a chromium and a cobalt complex of said monoazo-dyestuff.

2. A complex chromium compound of a monoazo-dyestuff free from sulfonic acid and carboxylic acid groups and corresponding to the formula

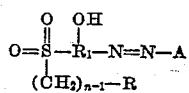

wherein R represents a benzene radical, $n$ represents a whole number which is at most 2, $R_1$ represents a benzene radical bound to the azo linkage in ortho-position relatively to the hydroxyl group and A represents the radical of a coupling component bound to the azo linkage in a position vicinal to a hydroxyl group.

3. A complex cobalt compound of a monoazo-dyestuff free from sulfonic acid and carboxylic acid groups and corresponding to the formula

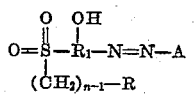

wherein R represents a benzene radical, $n$ represents a whole number which is at most 2, $R_1$ represents a benzene radical bound to the azo linkage in ortho-position relatively to the hydroxyl group and A represents the radical of a coupling component bound to the azo linkage in a position vicinal to a hydroxyl group.

4. A complex chromium compound of a monoazo-dyestuff free from sulfonic acid and carboxylic acid groups and corresponding to the formula

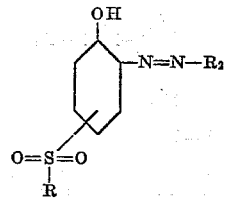

wherein R represents a benzene radical and $R_2$ the radical of a 5-pyrazolone bound to the azo linkage in 4-position.

5. A complex cobalt compound of a monoazo-dyestuff free from sulfonic acid and carboxylic acid groups and corresponding to the formula

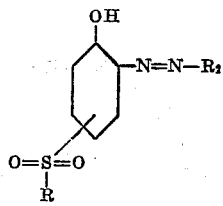

wherein R represents a benzene radical and $R_2$ the radical of a 5-pyrazolone bound to the azo linkage in 4-position.

6. A complex cobalt compound of a monoazo-dyestuff free from sulfonic acid and carboxylic acid groups and corresponding to the formula

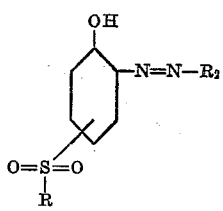

wherein R represents a benzene radical and $R_2$ the radical of an amide of an aliphatic β-keto-carboxylic acid bound to the azo linkage in α-position.

7. A complex cobalt compound of a monoazo-dyestuff free from sulfonic acid and carboxylic acid groups and corresponding to the formula

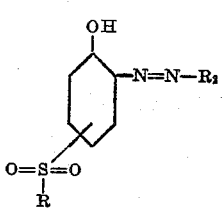

wherein R represents a benzene radical and $R_2$ the radical of an arylamide of an aliphatic β-ketocarboxylic acid bound to the azo group in α-position and containing an aromatically bound sulfonic acid amide group.

8. A complex cobalt compound of a monoazo-dyestuff free from sulfonic acid and carboxylic acid groups and corresponding to the formula

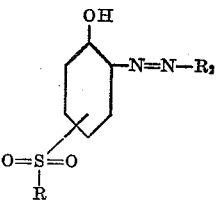

wherein R represents a benzene radical and $R_2$ the radical of a 3-methyl-5-pyrazolone bound to the azo linkage in 4-position.

9. A complex chromium compound of a monoazo-dyestuff free from sulfonic acid and carboxylic acid groups and corresponding to the formula

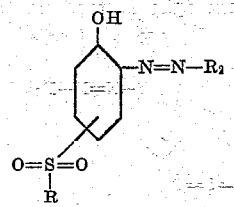

wherein R represents a benzene radical and $R_2$ the radical of 3-methyl-5-pyrazolone bound to the azo linkage in 4-position.

10. A complex chromium compound of a monoazo-dyestuff free from sulfonic acid and carboxylic acid groups and corresponding to the formula

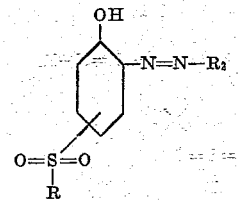

wherein R represents a benzene radical and $R_2$ the radical of a 5-pyrazolone-3-carboxylic acid amide.

11. A complex chromium compound of a monoazo-dyestuff free from sulfonic acid and carboxylic acid groups and corresponding to the formula

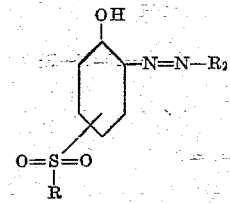

wherein R represents a benzene radical and $R_2$ the radical of a 1-aryl-3-methyl-5-pyrazolone bound to the azo linkage in 4-position and containing an aromatically bound sulfonic acid amide group.

12. A complex chromium compound of a monoazo-dyestuff free from sulfonic acid and carboxylic acid groups and corresponding to the formula

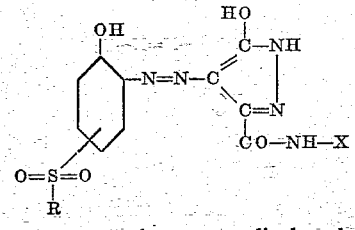

wherein R represents a benzene radical and X an alkyl group of low molecular weight.

13. A complex chromium compound of a monoazo-dyestuff free from sulfonic acid and carboxylic acid groups and corresponding to the formula

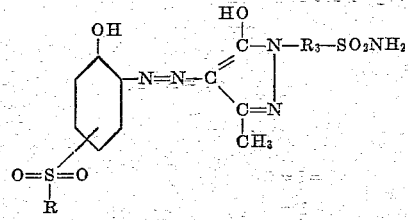

wherein R and $R_3$ each represent a benzene radical.

14. A complex cobalt compound of a monoazo-dyestuff free from sulfonic acid and carboxylic acid groups and corresponding to the formula

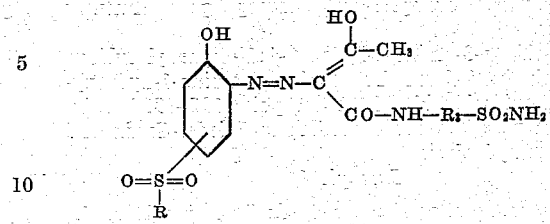

wherein R and $R_3$ each represent a benzene radical.

15. A complex cobalt compound of the monoazo-dyestuff of the formula

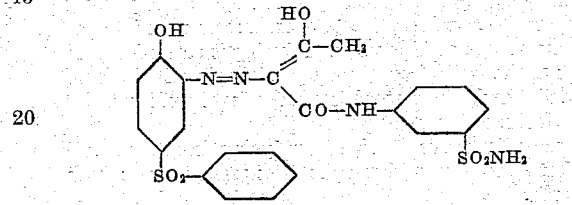

16. A complex cobalt compound of the monoazo-dyestuff of the formula

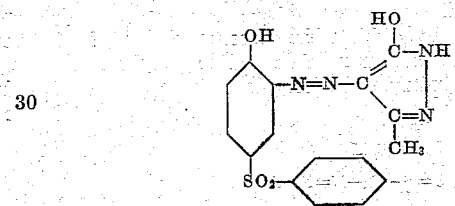

17. A complex chromium compound of the monoazo-dyestuff of the formula

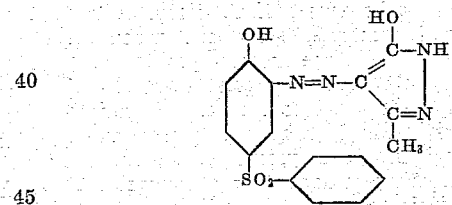

18. A complex chromium compound of the monoazo-dyestuff of the formula

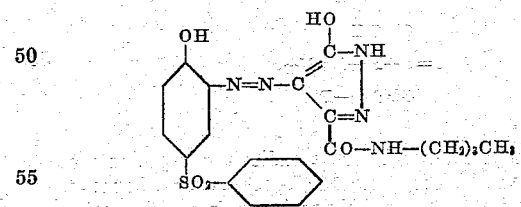

19. A complex chromium compound of the monoazo-dyestuff of the formula

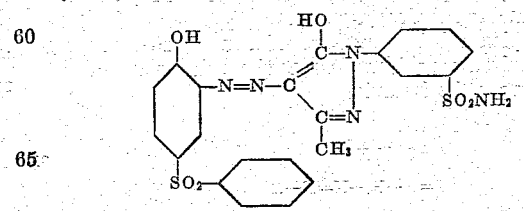

References Cited in the file of this patent
UNITED STATES PATENTS

| | | |
|---|---|---|
| 2,353,675 | Knecht | July 18, 1944 |
| 2,551,056 | Schetty | May 1, 1951 |
| 2,683,707 | Brassel | July 13, 1954 |